United States Patent
Rodriguez

(10) Patent No.: US 11,575,781 B1
(45) Date of Patent: Feb. 7, 2023

(54) PORTABLE MULTIFUNCTION PERSONAL ELECTRONIC DEVICE

(71) Applicant: Salvador Rodriguez, Yorkville, IL (US)

(72) Inventor: Salvador Rodriguez, Yorkville, IL (US)

( * ) Notice: Subject to any disclaimer, the term of this patent is extended or adjusted under 35 U.S.C. 154(b) by 0 days.

(21) Appl. No.: 17/167,423

(22) Filed: Feb. 4, 2021

Related U.S. Application Data

(60) Provisional application No. 62/969,913, filed on Feb. 4, 2020.

(51) Int. Cl.
*H04M 1/72409* (2021.01)
*G06F 3/16* (2006.01)

(52) U.S. Cl.
CPC ........ *H04M 1/72409* (2021.01); *G06F 3/167* (2013.01)

(58) Field of Classification Search
CPC ......... H04M 1/72409; H04M 1/72412; H04M 1/6066; H04M 1/6058; H04M 2250/02; H04M 1/0258; G06F 1/163; G06F 3/167
See application file for complete search history.

(56) References Cited

U.S. PATENT DOCUMENTS

| | | | |
|---|---|---|---|
| 5,918,316 A | 7/1999 | Nathanson et al. | |
| 7,427,149 B2 | 9/2008 | Sohn | |
| 8,009,847 B2 | 8/2011 | Planansky | |
| 8,010,156 B2 | 8/2011 | Warren | |
| 8,948,824 B2* | 2/2015 | Filson | G06F 1/1643 224/667 |
| 9,551,853 B2 | 1/2017 | Mansuy | |
| 9,631,804 B1 | 4/2017 | Glenn | |
| 10,021,157 B1 | 7/2018 | McLennan et al. | |
| 10,104,928 B2 | 10/2018 | Volmer | |
| 10,609,198 B2* | 3/2020 | Kim | G06F 3/165 |
| 2005/0232187 A1* | 10/2005 | Haller | H04W 84/10 370/328 |
| 2015/0036836 A1* | 2/2015 | Moon | H04R 1/1041 381/74 |

(Continued)

OTHER PUBLICATIONS

Heads-Up Display Mounts on Brim of Your Cap; Hackaday; https://hackaday.com/2012/03/21/heads-up-display-mounts-on-brim-of-your-cap/; last retrieved Aug. 31, 2022 (Exhibit A).

(Continued)

*Primary Examiner* — Keith Ferguson
(74) *Attorney, Agent, or Firm* — Brie A. Crawford; Crawford Intellectual Property Law LLC

(57) ABSTRACT

A portable multifunction personal electronic device electronically connects to one or more second electronic devices to aid in the ease of use of the one or more second electronic devices. The portable multifunction personal electronic device can be positioned as to be easily accessible to the user while the one or more second electronic devices can be stored. An optional ear piece can be electronically connected to the portable multifunction personal electronic device. The portable multifunction personal electronic device can be attached to a variety of clips to aid in attachment to a desired surface in a desired position. A method of using the portable multifunction personal electronic device rests the device against or attaches the device to a surface for ease of use.

4 Claims, 7 Drawing Sheets

(56) References Cited

U.S. PATENT DOCUMENTS

| | | | | |
|---|---|---|---|---|
| 2015/0302732 | A1* | 10/2015 | Wright | H04N 21/42204 |
| | | | | 340/5.25 |
| 2015/0350766 | A1* | 12/2015 | Schobel | H04W 76/10 |
| | | | | 381/77 |
| 2019/0124193 | A1* | 4/2019 | Kim | H04M 1/6066 |

OTHER PUBLICATIONS

Amazon.com: JBL Clip Portable Bluetooth Speaker With Mic, Red; Amazon; https:/https://www.amazon.com/JBL-Portable-Bluetooth-Speaker-Black/dp/B00KH632RK?th=1; last retrieved Aug. 31, 2022 (Exhibit B).

GPS Audible Golf Range Finder; Sharper Image; https://www.sharperimage.com/view/product/GPS+Audible+Golf+Range+Finder/206416; last retrieved Aug. 31, 2022 (Exhibit C).

BALANSOHO Bluetooth Beanie Hat Wireless Musical Knit Cap Washable with Stereo Speakers & Mic Fit for Outdoor Sports, Awesome Christmas Tech Gifts for Women Men Teen Boys Giris; Amazon Fashion https://www.amazon.com/BALANSOHO-Bluetooth-Wireless-Washable-Christmas/dp/B076KK22RV; last retrieved on May 13, 2021 (Exhibit D).

Home—IWBT1 Portable Bluetooth Speaker—Black; Best Buy; https://www.bestbuy.com/site/ihome-iwbt1-portable-bluetooth-speaker-black/5997268.p?skuld=5997268; last retrieved on May 14, 2021 (Exhibit E).

\* cited by examiner

PORTABLE MULTIFUNCTION PERSONAL ELECTRONIC DEVICE

CROSS REFERENCE TO RELATED APPLICATIONS AND INCORPORATION BY REFERENCE

This application claims priority to and is a non-provisional of U.S. Provisional Patent Application No. 62/969,913, titled PORTABLE MULTIFUNCTION PERSONAL ELECTRONIC DEVICE, with an application filing date of Feb. 4, 2020, in the United States Patent and Trademark Office, by the same inventive entity. The entire contents of U.S. Provisional Patent Application No. 62/969,913 are incorporated herein by reference to provide continuity of disclosure.

FIELD OF THE INVENTION

This invention relates to a portable multifunction personal electronic device that can interact with one or more second electronic devices for ease of use and more particularly, this invention relates to a portable multifunction personal electronic device that can interact with one or more second electronic devices to aid in the use of the one or more second electronic devices and that has a variety of attachment mechanisms for attaching the portable multifunction personal electronic device to a variety of structures and surfaces. A method of using the portable multifunction personal electronic device is also disclosed.

BACKGROUND OF THE INVENTION

In today's world, electronic devices are common. Electronic devices can include, but are not limited to, smart phones, tablets, lap tops, cellular phones, smart watches, gaming computers, desk top computers, and portable music players (hereinafter "portable electronic devices"). These electronic devices are convenient for people on the go. A person can use their electronic device and take phone calls, listen to music, or perform many other tasks while they are away from home. However, these electronic devices may be awkward or cumbersome to use while the person is out and about. For example, if a person receives a phone call, it may be difficult for the person to reach into their pocket to find and answer a cell phone before the caller disconnects the call. This can be especially difficult if the person is carrying other objects. A device that will allow a user to easily and conveniently interact with their electronic devices while they are on the go will be a useful invention.

Moreover, electronic devices may be awkward or cumbersome to use while a person is at home. While at home, a person can be moving from room to room. Therefore, it can be inconvenient for a person to carry their electronic device throughout the house. For example, if a person is cleaning and wants to listen to music on their cell phone, it can be difficult to carry the cell phone from room to room especially when the person is also carrying other objects. A device that will allow a user to easily and conveniently interact with their electronic devices throughout the house will be a useful invention.

Also, a person may want to interact with their electronic devices while driving. It can be cumbersome, and illegal, to operate an electronic device while driving. A person may want to listen to music on their electronic device while driving, but it can be difficult to place the device so that it is easy to hear and use. A device that will allow a user to easily and conveniently interact with their electronic devices while driving or in a car or other vehicle will be a useful invention.

SUMMARY OF THE INVENTION

Among the many objectives of the present invention is the provision of a portable multifunction personal electronic device.

Another objective of the present invention is the provision of a portable multifunction personal electronic device which can interact with one or more second electronic devices to aid in use of the one or more second electronic devices.

Moreover, an objective of the present invention is the provision of a portable multifunction personal electronic device which interacts with a clip which can attach to various surfaces.

A further objective of the present invention is the provision of a portable multifunction personal electronic device which interacts with a clip which is magnetized to allow the portable multifunction personal electronic device to attach to a variety of surfaces that can interact with the magnetized clip.

A still further objective of the present invention is the provision of a portable multifunction personal electronic device which can attach to a hat or other article of clothing to make the portable multifunction personal electronic device wearable.

Also, a method of using the portable multifunction personal electronic device is disclosed.

Other objectives and advantages of the invention will become apparent from the description of the preferred embodiments herein.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
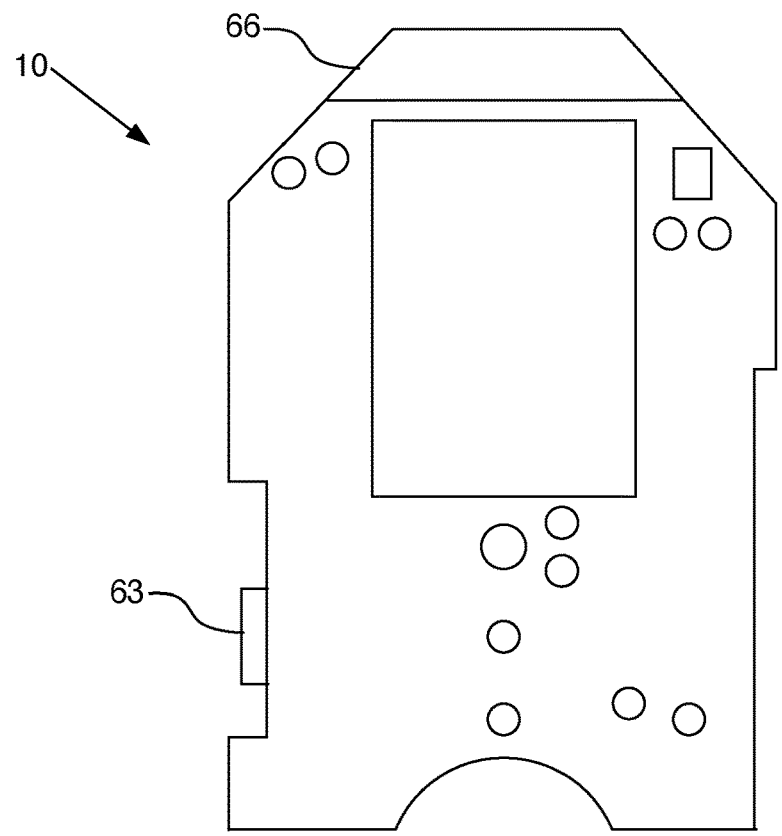
FIG. 1 depicts a front elevational view of the printed circuit board 66 of the portable multifunction personal electronic device 10 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

Figure 2:
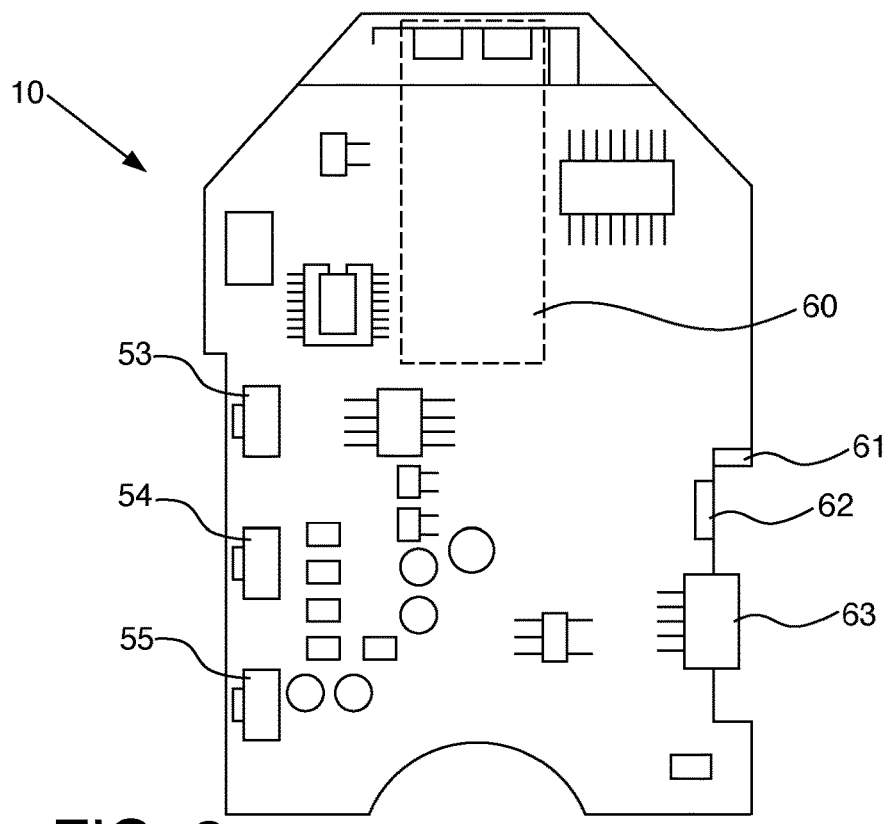
FIG. 2 depicts a rear elevational view of the printed circuit board 66 of the portable multifunction personal electronic device 10 of this invention.
Figure 3:
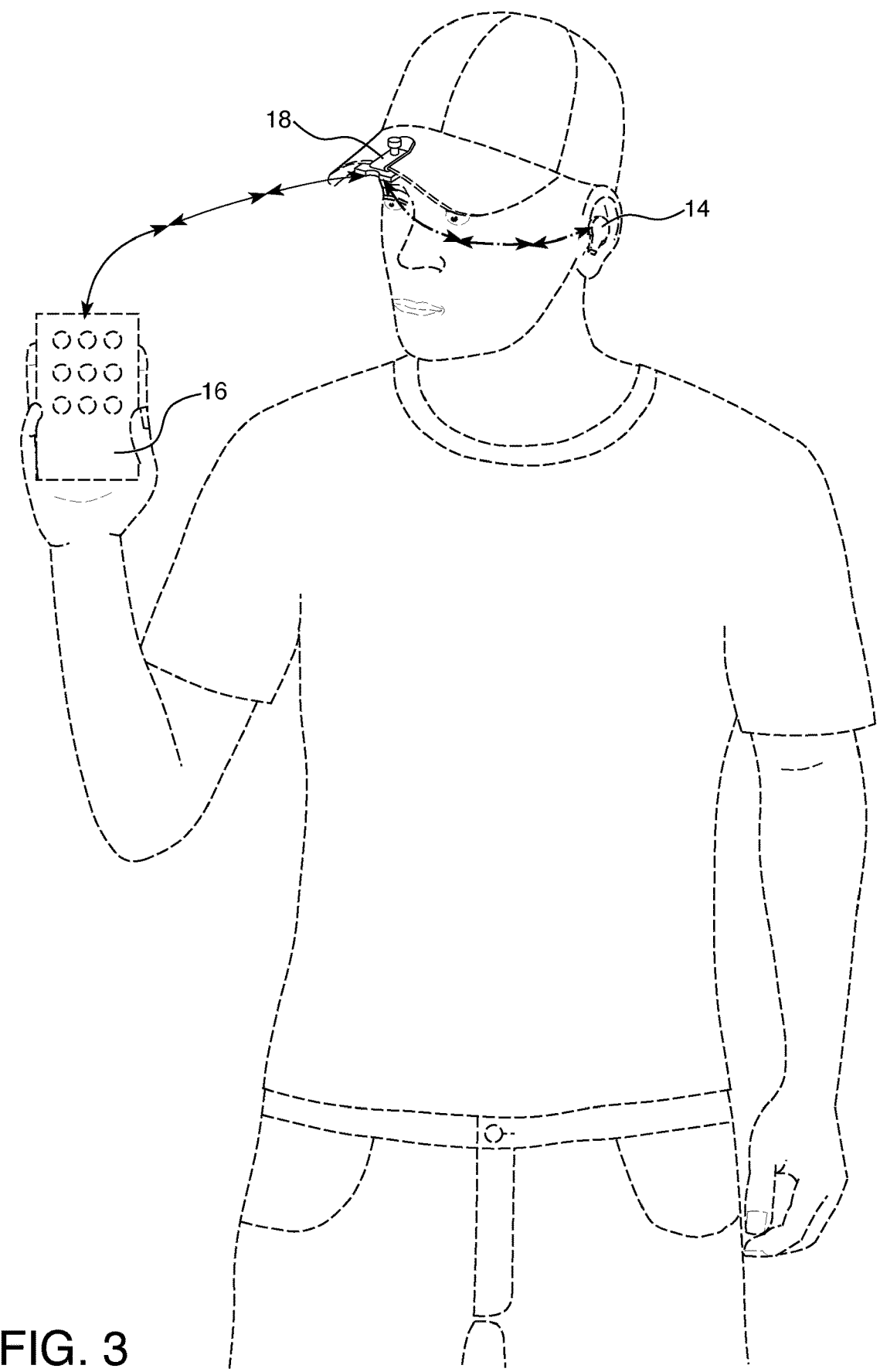
FIG. 3 depicts a relational view of the portable multifunction personal electronic device 10, ear piece 14, and second electronic device 16 with the ear piece 14, the second electronic device 16, and the user depicted in phantom.
Figure 5:
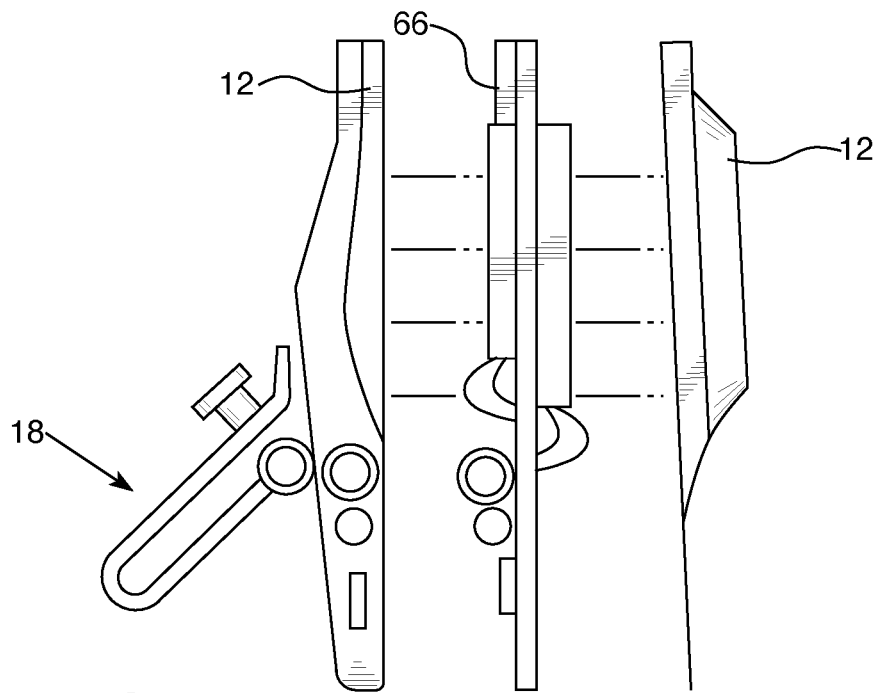
FIG. 5 depicts an exploded perspective view of the portable multifunction personal electronic device 10 and clip 18.
Figure 6:
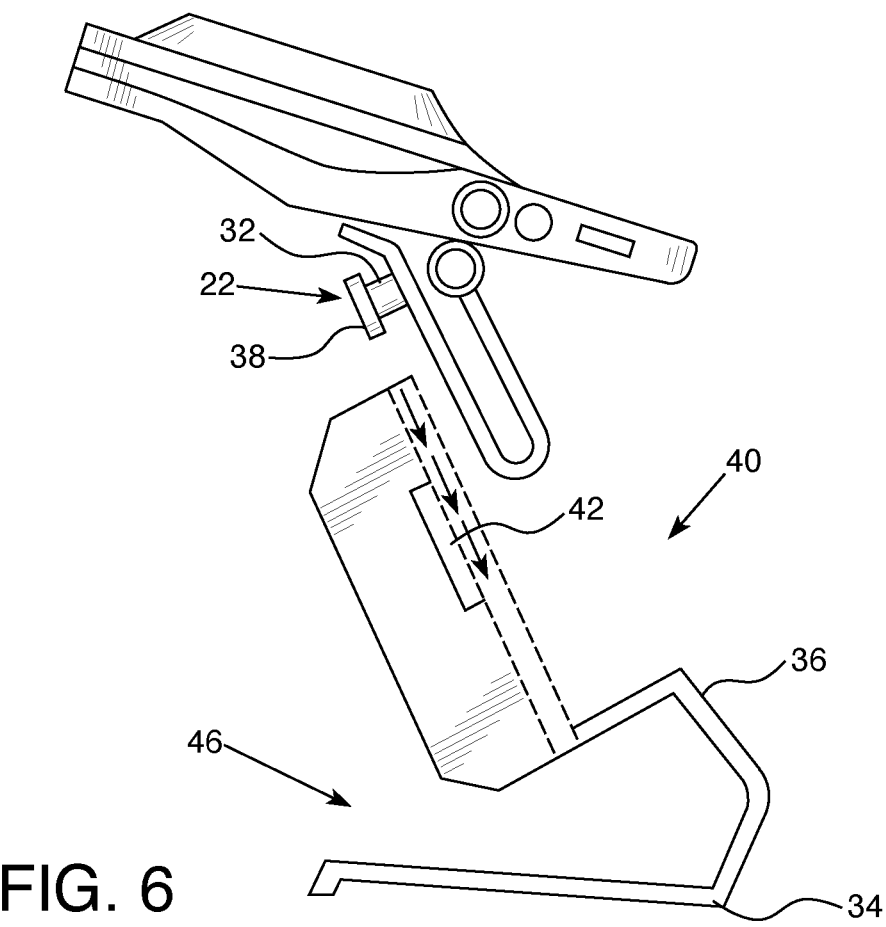
FIG. 6 depicts a side elevational view of the portable multifunction personal electronic device 10 attached to clip 18 and clip 18 attached to mounting stand 40.

Now adding FIG. 1, FIG. 2, and FIG. 3 to the consideration, the basic function of the invention can be easily understood. Portable multifunction personal electronic device 10 (hereinafter also referred to as "unit 10") has printed circuit board 66 housed by main body 12 (see FIG. 5) which has additional components and features which will be described further below. Unit 10 electronically communicates with (optional) ear piece 14 (and optionally through universal serial bus (hereinafter "USB") and ear piece jack 63) and second electronic device 16. It is noted that all electronic communication between unit 10, ear piece 14, and second electronic device 16 may be via wireless communication which includes, but is not limited to, Bluetooth® technology. Also, the wireless communication may be direct or through a network, or via wired communication, which wired communication may also be direct or through a network (and auxiliary port 61 may be used with an auxiliary cord as part of the wired communication).

Bluetooth is a registered trademark of Bluetooth Sig, Inc., a corporation organized under the laws of the State of Delaware, 5209 Lake Washington Boulevard, Suite 350, Kirkland, Wash., 98033, US Trademark Registration Number 2,909,356.

Ear piece 14 may be headphones, ear phones, ear buds, or any other type of electronic device that can project audio transmission from the second electronic device 16, received via unit 10, to the user.

Second electronic device 16 can include, but is not limited to, a smart phone or cellular phone, a tablet, a portable music device, a FitBit®, an Alexa® device, a lap top computer, a desk top computer, a gaming computer, or any other suitable electronic device and all such devices are encompassed by this disclosure and will be referred to as second electronic device 16. The term second electronic device 16 is meant to include one or more electronic devices 16.

FitBit is a registered trademark of FitBit, Inc., a corporation organized under the laws of the state of Delaware, 199 Freemont Street, 14th Floor, San Francisco, Calif., 94105, with US Trademark Registration Number 3,732,334 (among others).

Alexa is a registered trademark of Amazon Technologies, Inc., a corporation organized under the laws of the state of Nevada, 410 Terry Avenue, North Seattle, Wash., 98109, with US Trademark Registration Number 5,563,417 (among others).

Unit 10 can control all functions of second electronic device 16. Unit 10 can control these functions if second electronic device 16 is a smart phone, a tablet computer, a music player, or any other type of electronic device 16. The examples below are meant to be examples and are not meant to limit the function of unit 10 in any manner and unit 10 can control all functions of second electronic device 16 including, but not limited to, the examples below.

Figure 7:
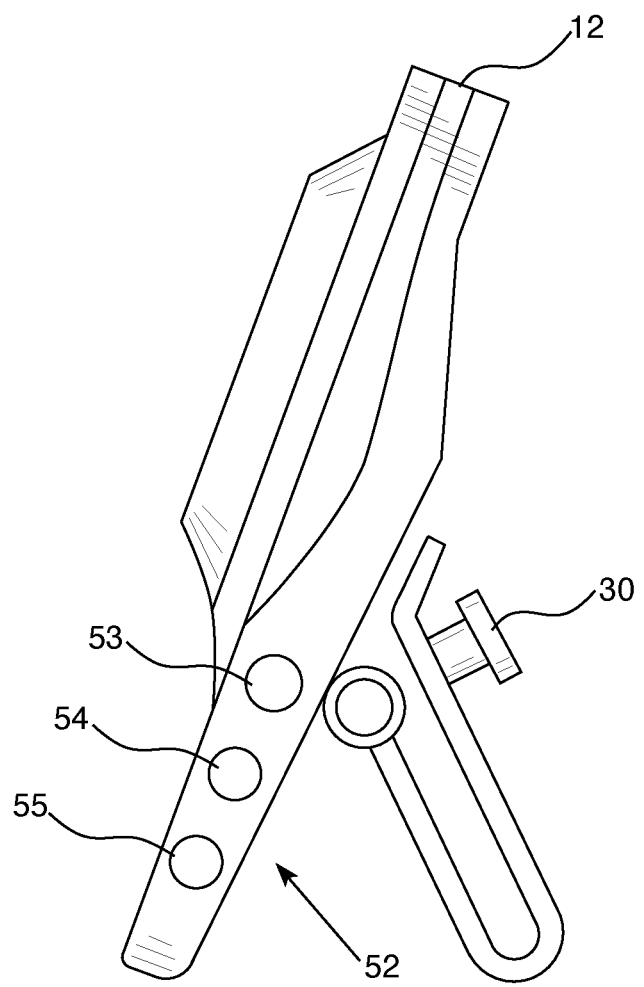
FIG. 7 depicts a side elevational view of portable multifunction personal electronic device 10 attached to clip 18.

Unit 10 has many features to accommodate a wide variety of electronic devices 16. Unit 10 has external features such as buttons 52 (see FIG. 7). Buttons 52 can be a single button or a series of buttons 52 to allow the user to interact with the unit 10 and the electronically connected second electronic device 16 and optional ear piece 14. There can be a button 52 for each function of interaction with the unit 10 and second electronic device 16 and optional ear piece 14. Or, a single button 52 can perform more than one function such as, if a person presses a single button 52 once, a first function is performed and if a person presses the same button 52 twice, a second function is performed.

Unit 10 has speaker(s) 60 which are able to project incoming audio transmissions from the user's second electronic device 16 to unit 10. Also, unit 10 has microphone 62 to allow the user to communicate with the unit 10 to send transmissions to second electronic device 16 and optional ear piece 14.

Some of the functions performed by one or more buttons 52, speakers 60, and microphone 62 include controlling second electronic device 16 with a music player and such functions include, but are not limited to, playing and pausing a song, turning the volume down and playing a previous song 54, playing the next song, turning the volume up and skipping songs 53, and/or starting or stopping the transmission of music.

Or, buttons 52, speakers 60, and microphone 62 can control second electronic device 16 which is a smart phone and some functions include, but are not limited to, answering, ignoring, or disconnecting a phone call, sending a text, receiving an audio transmission of a text, receiving an alarm or notification or an audio transmission of either, controlling the volume, and/or redialing a number from a previous phone call. Moreover, button 55 can also power on or power down the unit 10.

Also, unit 10 through speakers 60 and microphone 62 allows a person to receive a phone call when it is electronically connected to second electronic device 16 which is a cellular or smart phone.

It is preferred that the speaker(s) 60 be able to communicate information on unit 10 from second electronic device 16 up to 100 to 105 decibels. However, this range is not meant to limit the scope of the invention in any manner and any suitable decibel range is encompassed by this disclosure.

Furthermore, unit 10 is adapted to communicate with second electronic device 16 when it is used as a music player and when it is used as a cell phone. The user can be listening to music on unit 10 through smart phone second electronic device 16. If a call comes in on smart phone second electronic device 16 and the user answers the call, unit 10 automatically pauses the music to allow the user to take the call and resumes the music when the user disconnects the call.

Unit 10 has voice command features and the voice commands are received through microphone 62. Voice command can control any of the features described above or any feature of the second electronic device 16 or ear piece 14 (even those features not described above). The voice command features allow a user to accept a call, disconnect a call, ignore a call, or answer a call with a text message via voice command. Or, the voice command can allow a user to interact with a music player to perform the functions described above (even those features not described above). These examples are meant only as examples are not meant to limit the scope of the voice command features and any feature of second electronic device 16 or ear piece 14 can be controlled by voice command and is emcompassed by this disclosure.

Figure 4:
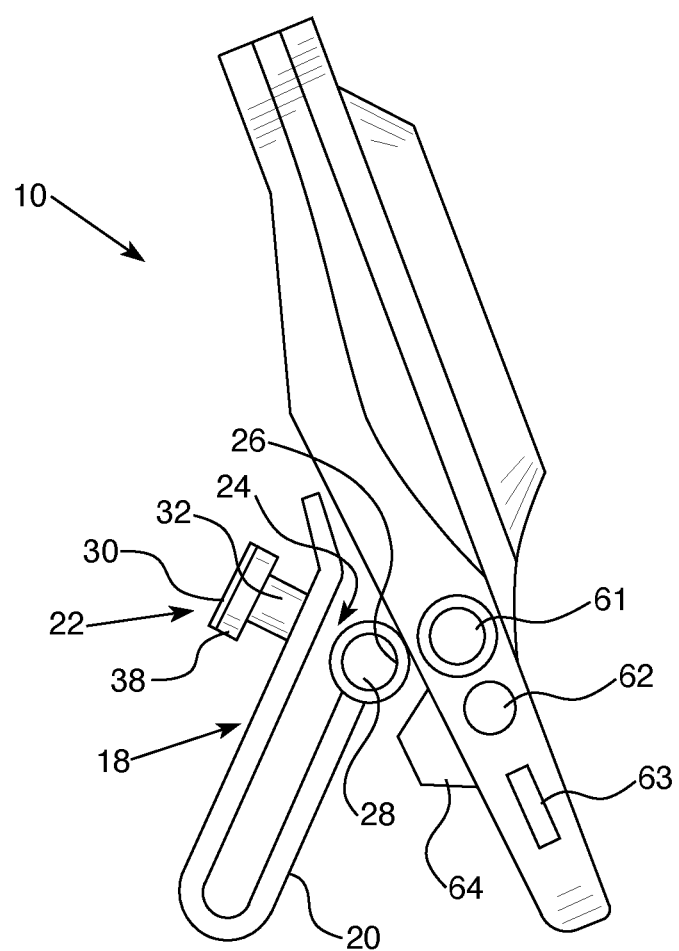
FIG. 4 depicts a side elevational view of the portable multifunction personal electronic device 10 attached to clip 18.

Unit 10 also has light emitting diode (hereinafter "LED") light 64 (See FIG. 4). LED light 64 can be used to show when second electronic device 16 is synchronizing to unit 10 and may be a first color when the second electronic device 16 is synchronized to unit 10 and may stay a first color as long as second electronic device 16 is synchronized to unit 10. Also, LED light 64 may be a second color when second electronic device 16 is not synchronized to unit 10 and may stay this second color as long as second electronic device 16 is not synchronized to unit 10. LED light 64 may flash the first color during the synchronization process and may stay the first color in a non-flashing fashion for as long as the unit 10 is synchronized to second electronic device 16. LED light 64 may be a third color (which may be the same or different from the first or second colors), to indicate when the battery of unit 10 is charging and a fourth color (which must be different from the third color, but may be the same or different as the first or second color) when the battery of unit 10 is fully charged.

The visual indicator of LED light 64 described is the changing of colors and the flashing or non-flashing of colors. However, any visual indicator of LED light 64 can be used and is encompassed by this disclosure such as, but not limited to, flashing codes (such as five flashes means the battery of unit 10 is fully charged).

The visual indicator functions of the colors above can also be used to show when calls, texts, or voicemails are incoming. The same colors (first, second, third, or fourth) can be used or different colors and flash patterns can be used.

In the depicted embodiment, a LED light 64 is utilized. However, unit 10 can have any suitable light source and all such light sources are encompassed by this disclosure.

Second electronic devices 16 that have been previously synchronized to unit 10 may automatically resynchronize when reconnection is desired.

Unit 10 may also search for nearby second electronic devices 16 or optional ear pieces 14 when it is not connected to any electronic device 16 or optional ear piece 14. This is advantageous because it alerts the user to possible devices 16 or ear pieces 14 that may be in range for an electronic connection.

A small icon or other indicators may be present on second electronic device 16 to show how much charge unit 10 or optional ear piece 14 has. A small icon or other indicator can also be present to show when optional ear piece 14 is connected to unit 10 and when unit 10 is connected to second electronic device 16.

Now adding FIG. 4, FIG. 5, FIG. 6, and FIG. 7 to the consideration, the structure of clip 18 (also called "device clip") can be clearly seen. Clip 18 has clip body 20. Clip body 20 has hinge knuckle 26 and unit 10 has hinge pin 28. The interaction of knuckle 26 and hinge pin 28 creates a pivot point 24 about which the knuckle 26 and hinge pin 28 can move relative to each other. Knuckle 26 can be one or more knuckles 26 and all such numbers are encompassed by this disclosure.

The movement of knuckles 26 and hinge pin 28 about pivot point 24 allows the user to position unit 10 as is convenient and desired for use.

Figure 8:
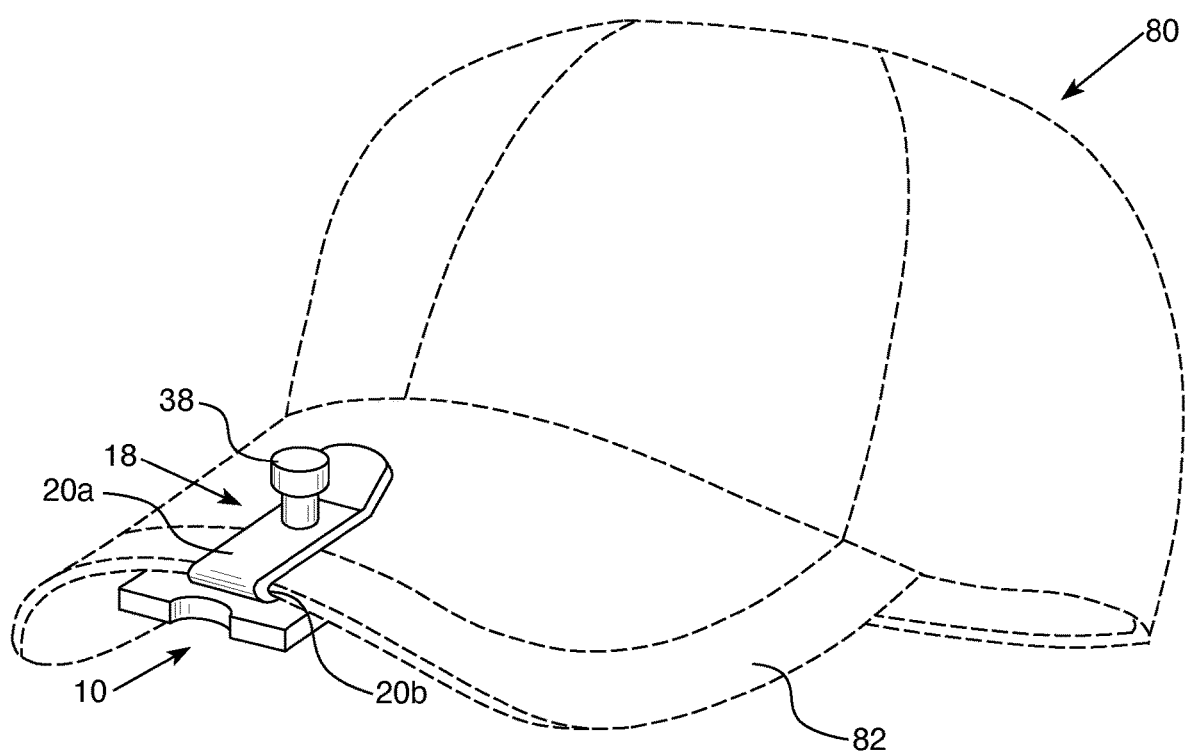
FIG. 8 depicts a front perspective view of clip 18 attached to hat 80 with hat 80 depicted in phantom.

Clip 18 has body upper member 20a and body lower member 20b (see FIG. 8). Members 20a and 20b can be used to secure the unit 10 to a variety of surfaces by inserting the desired surface or a portion of the desired surface between members 20a and 20b. The desired surface can be, but is not limited to, the sun visor of a vehicle, but all appropriate and desired surfaces are encompassed by this disclosure.

On the opposing end of knuckle 26 on clip body 20 is mounting tab 22 which has mounting tab head 38 and mounting tab stem 32. Mounting tab 22 aids in securing clip 18 to another structure such as mounting stand 40 (see FIG. 6). Mounting tab stem 32 inserts into aperture 42 and is secured in aperture 42 through mounting tab head 38. As a result, unit 10 is securely, but removably attached to, mounting stand 40.

Mounting stand 40 has mounting spring clip 46. Mounting spring clip 46 allows mounting stand 40 to rest against a flat surface, such as furniture, and support unit 10 in a desired position. Or, mounting spring clip 46 can attach to a surface, such as a car sun visor, and support unit 10 in a desired position. The surface, such as the car sun visor, inserts between first side 34 and second side 36 and the connection can be removed as desired.

It is optional for mounting tab 22 to have magnet 30 attached to mounting tab head 38. Magnet 30 can aid in attaching unit 10, through clip 18, to metallic surfaces or other surfaces which can accommodate magnet 30 in a secure and removable fashion. Aperture 42 can be made of or lined with metal, or any suitable material which can form a magnetic attraction, thus further securing the connection between unit 10 and mounting stand 40.

Also, instead of magnet 30 attached to mounting tab 22, mounting tab 22 can be made of a magnetic material. The magnetic material can include any ferromagnetic material such as, but not limited to, iron, nickel, cobalt, or any suitable material for creating a magnetic surface and all such materials are encompassed by this disclosure.

Now adding FIG. 8 to the consideration, the attachment of unit 10 to hat 80 can be clearly seen. The brim 82 of hat 80 inserts between body upper member 20a and a body lower member 20b. The pivot point 24 is on an underside of brim 82 so unit 10 can be flipped downward toward the user's face for better listening and use of the unit 10.

This attachment between unit 10 and hat 80 is removable so the user can move and use the unit 10 as desired.

Figure 9:
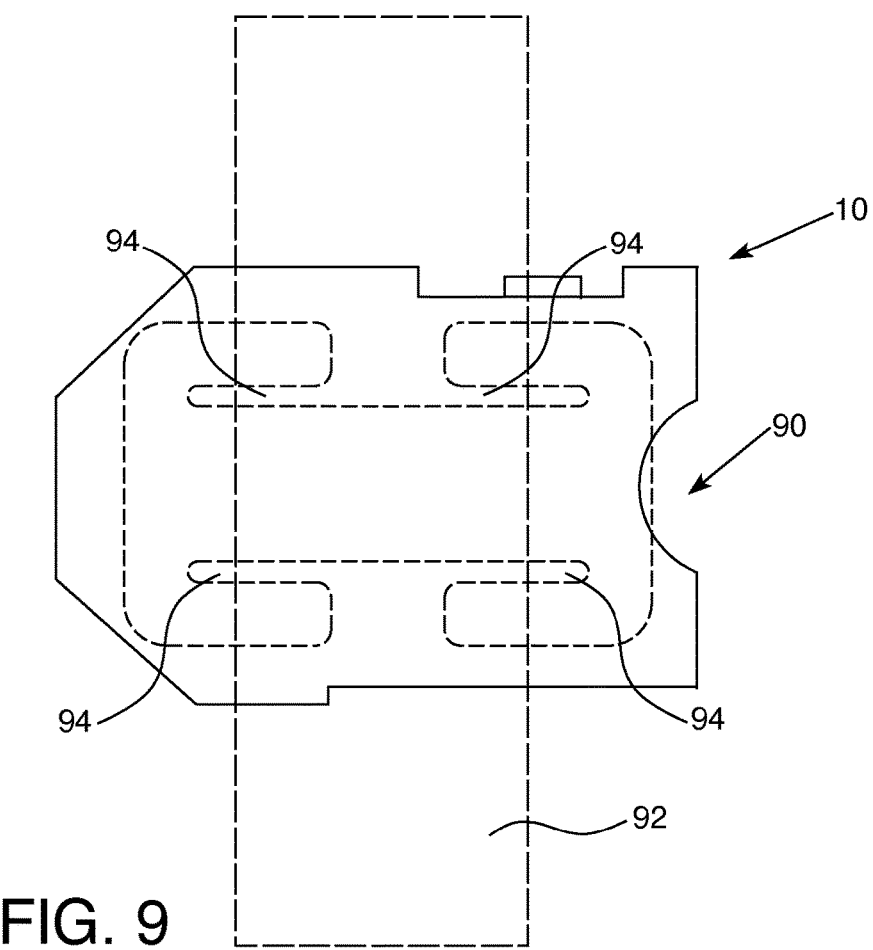
FIG. 9 depicts a front elevational view of portable multifunction personal electronic device 10 attached to belt clip 90 with the belt clip 90 and the seat belt 92 depicted in phantom.

Now adding FIG. 9 to the consideration, the structure and function of belt clip 90 can be clearly seen. Belt clip 90 is depicted in phantom to show its relationship to unit 10 and seat belt 92. In this figure, belt clip 90 is attached to a seat belt 92. However, belt clip 90 can attach to any suitable belt or surface and all such belts and surfaces are encompassed by this disclosure and are hereafter referred to as seat belt 92.

Belt clip 90 has slits 94 and seat belt 92 threads through slits 94 which creates the adjustable attachment between belt clip 90 and seat belt 92. Unit 10, which is attached to clip 18, attaches to belt clip 90 through magnet 30 on mounting tab 22. Magnet 30 directly attaches to belt clip 90. In an alternate embodiment, clip 18 is made of a magnetic material and attaches to belt clip 90, through mounting tab head 38 or any other suitable part of clip 18, without the need for additional magnet 30.

Figure 10:
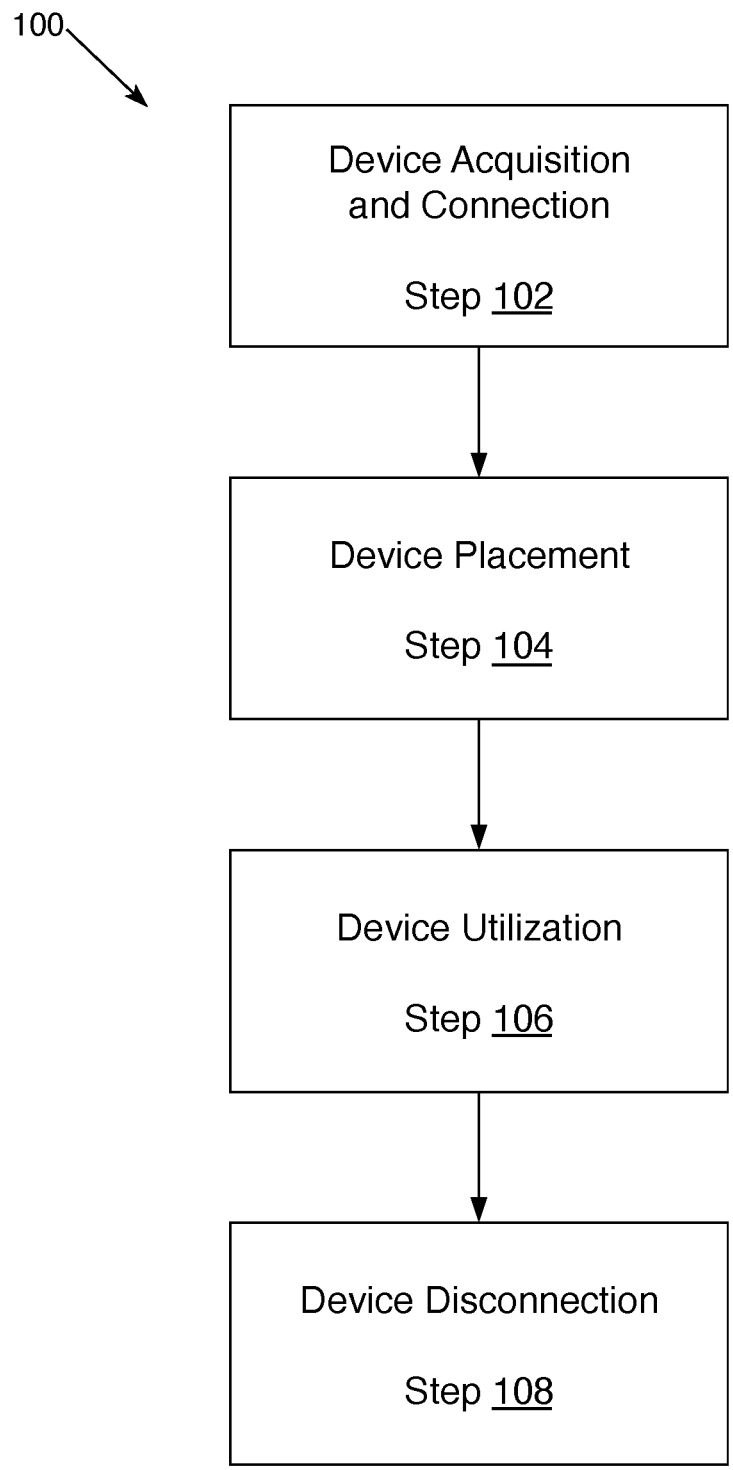
FIG. 10 depicts a process flow chart of method 100.

Now adding FIG. 10 to the consideration, method 100 can be clearly seen. Method 100 has the following steps. As will be obvious to persons of ordinary skill in the art, the steps, or steps equivalent thereto, may be practiced in any reasonable order which will produce the desired result.

STEP 102 is the device acquisition and connection step. In STEP 102, a unit 10 and an second electronic device 16 and optional ear piece 14 are obtained. Unit 10 is electronically connected to second electronic device 16 and, if present, ear piece 14 through any suitable means including, but not limited to, a wired or wireless connection.

STEP 104 is the device placement step. In STEP 104, unit 10 and second electronic device 16, and if present, ear piece 14 are positioned as desired. It is noted that unit 10 and second electronic device 16 and, if present, ear piece 14 can be placed in their desired positions before they are electronically connected to each other.

The desired position can be any desired position and can include, but is not limited to, attaching the unit 10 to a mounting stand 40, a hat 80, or a belt clip 90. The second electronic device 16 can be positioned anywhere as desired including, but not limited to, a pocket, a purse or bag, or on a piece of furniture. It is preferred that once the unit 10 and second electronic device 16 and if present, ear piece 14 are positioned, they are able to connect electronically and this may be limited by the reach of a wire or cable for a wired connection or through an electronic range for a wireless connection.

As noted previously, unit 10 may be attached to a clip 18, hat 80, or a belt clip 90 and either may or may not be used to place unit 10 in the desired position.

STEP 106 is the device utilization step. In STEP 106, the second electronic device 16 is utilized as desired, with the assistance of unit 10 and optional ear piece 14. The user uses unit 10 to control their interaction with second electronic device 16 and optional ear piece 14. For example, the user can use unit 10 to listen to music played on second electronic device 16 and/or answer and make phone calls through the interaction of unit 10 and second electronic device 16.

STEP 108 is the device disconnection step. In STEP 108, unit 10 is disconnected from second electronic device 16 as the user desires. The disconnection can include detaching cables or wires for a wired connection, or turning off unit 10 or otherwise disconnecting a wireless connection. Unit 10 may also be removed from the desired position for storage.

The following improvements, while not illustrated, may also be added to the preferred embodiments to enhance the utility of the invention as practiced:

1) A night light may be added to the unit 10 so that the user can see the unit 10 and its components more easily in environments with limited light.

2) A solar power cell may also be located on unit 10 to aid in charging the battery of unit 10.

3) Unit 10 may have a micro-secure digital port (hereinafter "micro-SD") to receive a micro-SD card containing stored music or other content.

4) Unit 10 may have a built in Global Positioning System (hereinafter "GPS") that allows it to provide maps and directions and advise the user of their current location.

5) Unit 10 may have a flip down screen to present information to the user, including that which may be presented by the optional GPS, and allows the user to interact with unit 10 (which can then interact with second electronic device 16 and optional ear piece 14).

6) Unit 10 may include an FM transmitter or other transmitter so that the unit 10 can interact with the second electronic device 16 to play music over a radio or other music system of a vehicle.

7) The battery that powers unit 10 may be a rechargeable battery and may in particular be a lithium ion battery as is commercially available (though any suitable rechargeable battery is encompassed by this disclosure).

8) Unit 10 may be water resistant or water proof to provide protection to unit 10. The main body 12 may be made of a water-resistant or water-proof material or unit 10 may have a separate water-resistant or water-proof case.

9) Unit 10 may be programmed to turn off if it has not been used for a specific period of time. For example, unit 10 may automatically turn off if it has not been used for a period of three minutes (three minutes is meant to be exemplary and any time interval can be used and is encompassed by this disclosure). This can aid in prolonging the life of the battery for unit 10.

10) Unit 10 may be programmed to indicate over the speakers 60 when the battery of unit 10 is low.

While various embodiments and aspects of the present invention have been described above, it should be understood that they have been presented by way of example only, and not limitation. Thus, the breadth and scope of the present invention should not be limited by any of the above exemplary embodiments.

This application—taken as a whole with the abstract, specification, claims, and drawings being combined—provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this device and method can become clear to a person having ordinary skill in this particular art. Such modifications are clearly covered by this disclosure.

The invention claimed is:

1. A clip for a portable multifunction personal electronic device comprising:
   a) the portable multifunction personal electronic device being attached to the clip through a hinge, wherein the clip has a clip body and the clip body has at least one hinge knuckle and the main body of the portable multifunction personal electronic device has a hinge pin, further wherein the at least one hinge knuckle and the hinge pin cooperate to form a hinge and a pivotable relationship between the portable multifunction personal electronic device and the clip;
   b) the clip body having an upper member and a lower member, wherein a mounting surface or a portion of the mounting surface can be inserted between the upper member and the lower member to connect the clip to an object and the hinge allowing the portable multifunction personal electronic device to be positioned as desired; and
   c) the clip having a mounting tab with a mounting tab head and a mounting tab stem, wherein the mounting tab stem inserts into an aperture on a mounting stand and the mounting tab is secured in the aperture through the mounting tab head, further wherein the portable multifunction personal electronic device is removably secured to the mounting stand.

2. The clip of claim 1 further comprising:
   a) the mounting stand having a mounting spring clip, wherein the mounting spring clip allows the mounting stand to rest against a desired surface, or further wherein the mounting spring clip can attach to a desired surface by inserting the desired surface or a portion of the desired surface between a first side and a second side of the mounting spring clip.

3. The clip of claim 1 further comprising:
   a) the mounting surface being a hat, wherein a brim of the hat inserts between the upper body member and the lower body member to secure the clip to the hat wherein the portable multifunction personal electronic device can be pivoted downwardly from the brim of the hat toward the user's face; and b) the clip being removable from the brim of the hat.

4. A belt clip for a portable multifunction personal electronic device comprising:

a) the belt clip having at least one slit, wherein the at least one slit is able to receive a belt;

b) the portable multifunction personal electronic device being attached to a device clip through a hinge, wherein the device clip has a device clip body and the device clip body has at least one hinge knuckle and the main body of the portable multifunction personal electronic device has a hinge pin, further wherein the at least one hinge knuckle and the hinge pin cooperate to form a hinge and a pivotable relationship between the portable multifunction personal electronic device and the device clip; and c) the device clip having a mounting tab with a mounting tab head and a mounting tab stem, wherein the mounting tab head is magnetic and the magnet cooperates with a magnetic surface of the belt clip to secure the portable multifunction personal electronic device to the belt.

\* \* \* \* \*